L. W. HOSFORD.
HAT MIRROR.
APPLICATION FILED NOV. 26, 1919.
1,358,551. Patented Nov. 9, 1920.
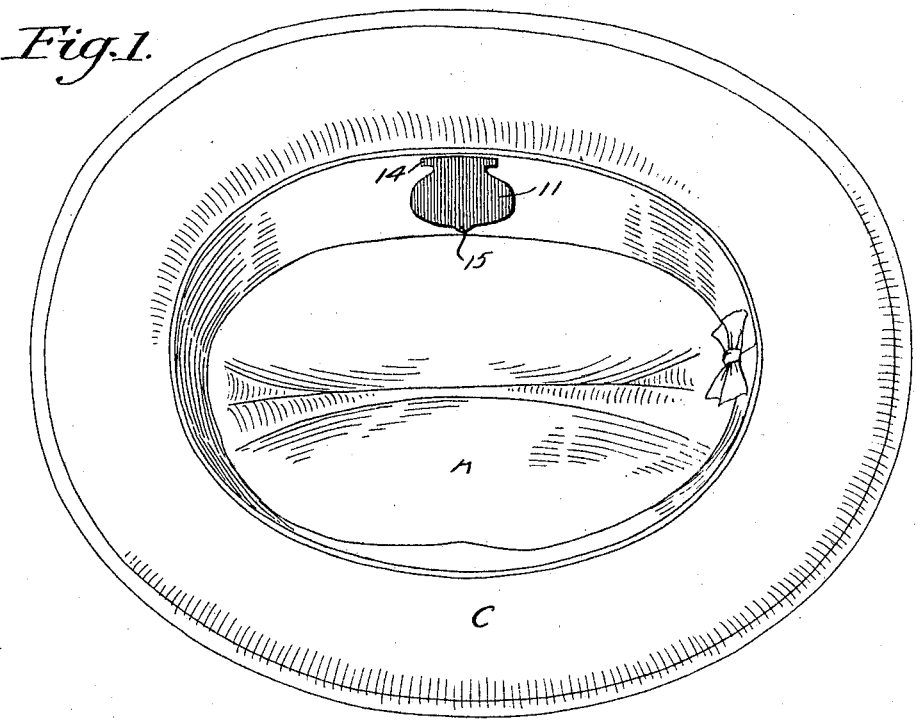
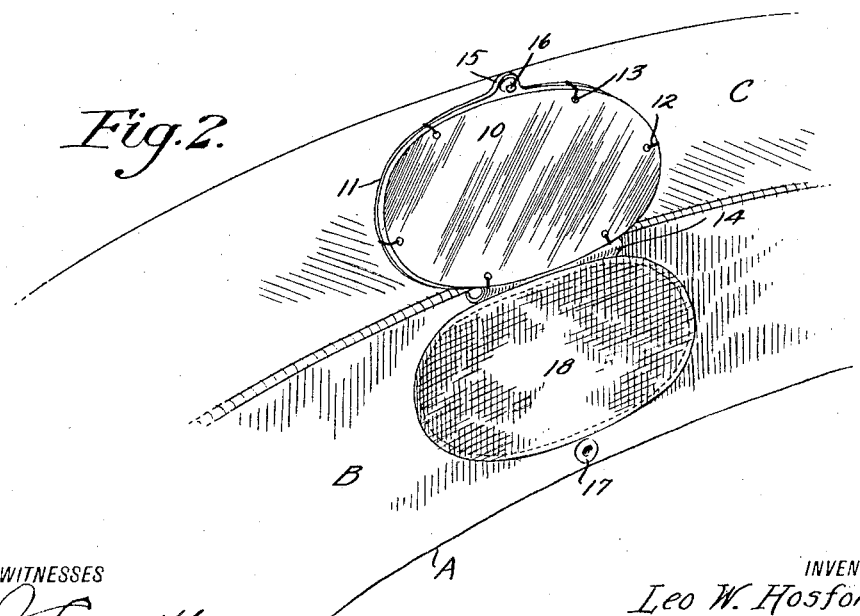
INVENTOR
Leo W. Hosford.

UNITED STATES PATENT OFFICE.

LEO WILLIAM HOSFORD, OF ALAMEDA, CALIFORNIA.

HAT-MIRROR.

1,358,551.

Specification of Letters Patent.

Patented Nov. 9, 1920.

Application filed November 26, 1919. Serial No. 340,774.

*To all whom it may concern:*

Be it known that I, LEO W. HOSFORD, a citizen of the United States, and a resident of Alameda, in the county of Alameda and State of California, have invented a new and Improved Hat-Mirror, of which the following is a description.

My invention relates to a mirror attachment adapted to be applied to hats generally in a manner to be readily available for use when required, a purpose being to provide a mirror convenient for use in emergencies, as for example, the examination of one's eye for a spark or other foreign matter.

The nature of the attachment and its advantages will more clearly appear from the specific description following:

Reference is to be had to the accompanying drawings forming a part of this specification, it being understood that the drawings are merely illustrative of one example of the invention.

Figure 1 is a perspective view of the interior of a hat showing my attachment in position thereon in a manner to permit the wearing of the hat;

Fig. 2 is a perspective view on an enlarged scale showing a portion of the hat and the mirror raised to a position for use.

In carrying out my invention in practice, a mirror 10 of any suitable form is secured to a flap 11. In the present example the mirror which may be of metal or of glass is shown as formed with a series of holes 13 about the edge thereof and secured by stitches 12 to a carrying flap 11.

The flap 11 is preferably of strong flexible material such as leather and is provided with an elongated member 14 beyond the mirror and adapted to be secured to the sweatband B of any hat or cap A along the lower edge of said sweatband. Thus, the flap 11 with the mirror may be swung on the member 14 as a hinge from a position inside the hat or cap adjacent to the sweatband surface or when the hat or cap is removed and inverted, said flap may be swung upwardly and onto the brim C of the hat or onto the vizor of the cap, so that the flap may find support on the brim or vizor and be grasped therewith to hold the mirror in a convenient and serviceable position.

Advantageously, the flap 11 has a tab 15 at its free edge and at that side of the mirror opposite the hinge, the tab forming a finger hold for swinging the flap and mirror from one position to the other. In order to hold the flap and mirror in the position of disuse, close to the sweatband and within the hat or cap, the tab 15 has a suitable fastener element 16, there being a mating fastener element 17 on the hat or cap at the interior in position to be detachably engaged by said element 16. The fastener elements may be readily disengaged by grasping the tab 15 and the flap and mirror then swung to the serviceable position at the brim or vizor. It will be noted that the flap 11 forms a backing for the mirror and when the latter is fastened in the position of disuse its character as a mirror will not be apparent when the hat or cap is doffed or not in use.

To prevent soiling or scratching of the face of the mirror 10, the attachment includes a facing piece 18 of soft material adapted to be secured to the sweatband B to receive contact of the mirror face.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. An attachment for hats or caps, including a flap, a mirror secured thereto so that the flap forms a backing and covering for the mirror, said flap having a flexible attaching member beyond a side of the mirror for securing the flap and mirror hingedly to the hat or cap adjacent to the brim or vizor, there being a tab on the flap extending beyond the mirror at the opposite edge portion from said hinge member, said hinge permitting the flap and mirror to be swung through an arc to dispose the mirror at the interior of the hat or cap or to a position adjacent the under surface of the brim or vizor, and means to detachably fasten said tab when the mirror is in position of disuse within the hat or cap.

2. An attachment for hats or caps, including a flap, a mirror secured thereto so that the flap forms a backing and covering for the mirror, said flap having a flexible attaching member beyond a side of the mirror for securing the flap and mirror hingedly to the hat or cap adjacent to the brim or vizor, there being a tab on the flap extending beyond the mirror at the opposite edge portion from said hinge member, said hinge permitting the flap and mirror to be swung though an arc to dispose the mirror at the interior of the hat or cap or to a position adjacent the under surface of the brim or vizor, and means to detachably fasten said tab when the mirror is in position of disuse within the hat or cap; together with a facing piece of flexible material having an area to protect the mirror face and adapted to be secured to the sweatband for the face of the mirror to contact therewith.

3. An attachment for hats or caps, including a mirror, a flap carrying said mirror, and an elongated flexible element on said flap and extending beyond the mirror at one edge thereof, said element being adapted to be secured to a hat or cap for positioning the mirror at the sweatband adjacent to a brim or vizor.

LEO WILLIAM HOSFORD.